June 14, 1938.    A. E. WILSHUSEN    2,120,824
DEFLECTOR MECHANISM
Filed May 6, 1935
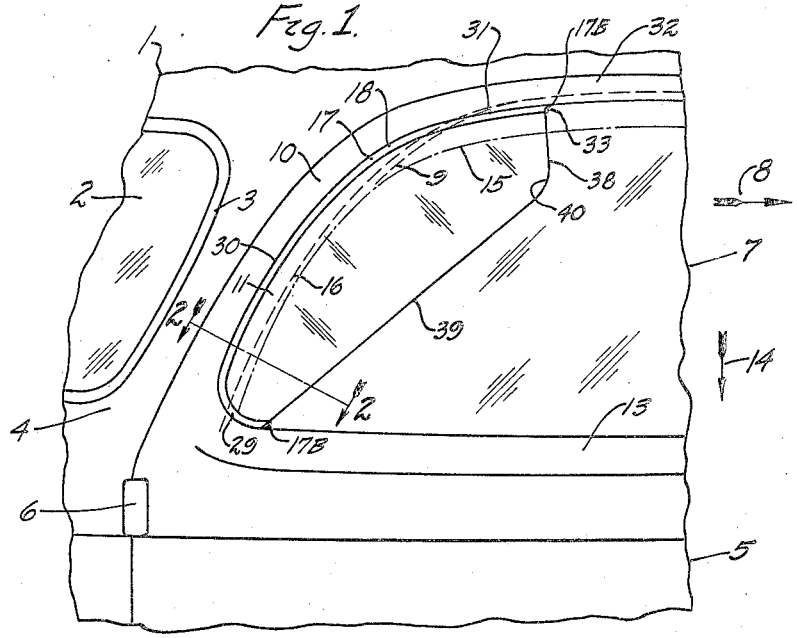
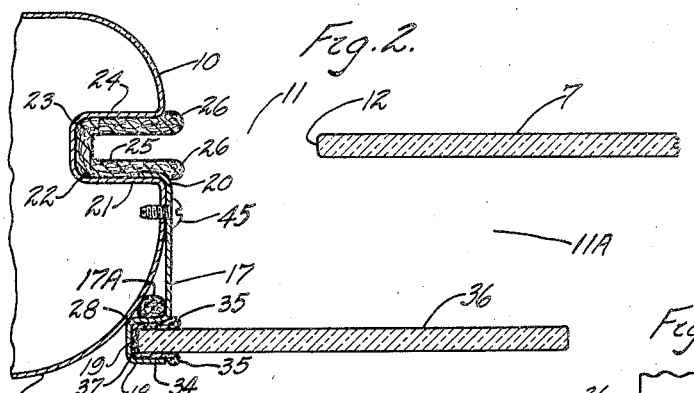
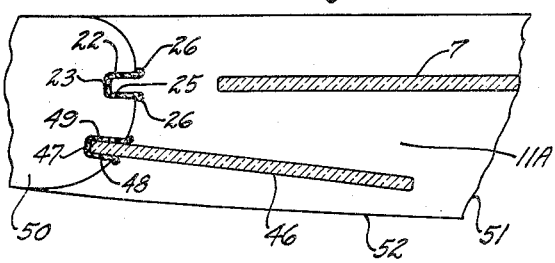
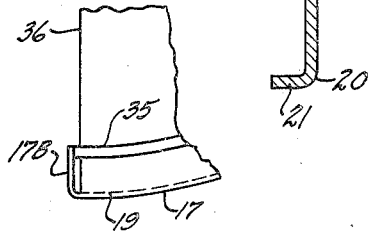
INVENTOR.
August E. Wilshusen
BY George B. Ingersoll
ATTORNEY.

Patented June 14, 1938

2,120,824

UNITED STATES PATENT OFFICE 2,120,824

DEFLECTOR MECHANISM

August E. Wilshusen, Detroit, Mich.

Application May 6, 1935, Serial No. 19,957

17 Claims. (Cl. 296—84)

My invention relates to improvements in deflector mechanisms used in association with movably mounted windows of a vehicle and the objects of my improvements are, first, to provide a deflector mechanism that will readily fit within the frame structure of a window of a vehicle; second, to provide a deflector mechanism that will prevent any air, rain, dust, etc., from passing between the inner or forward end or side of the deflector mechanism and the frame of the window structure of the vehicle; third, to provide a deflector mechanism provided with a frame or supporting structure adapted to be readily secured to the frame of the window structure of a vehicle; fourth, to provide a deflector mechanism having its deflector member mounted directly in the frame of the window structure of a vehicle; fifth, to provide a deflector mechanism capable of being mounted and located entirely within the maximum cross section of a door mechanism of a car when said cross section is extended to a point adjacent the deflector mechanism; sixth, to provide a deflector mechanism which does not extend beyond the outline of a door to engage an air stream; seventh, to provide a deflector mechanism for a body of an automotive vehicle which in association with a movable window provides an air passage through which the air leaving the body can only pass in a rearwardly direction in a stream joining that of the airstream flowing past the body; and eighth, to provide a deflector frame member having a channel portion together with end portions for closing open ends of the channel portion to retain a cushion member therein.

I attain these objects by the mechanism illustrated in the accompanying drawing, in which:

Figure 1 is a partial side view of the body of an automotive vehicle equipped with my deflector mechanism; Fig. 2, a partial sectional view of the frame of the window structure of the vehicle together with a partial sectional view of the movably mounted window of the vehicle, said sectional view further disclosing a complete sectional view of the deflector mechanism taken on the line 2—2, Fig. 1; Fig. 3, a sectional view through the deflector mechanism, said deflector mechanism being disclosed as being assembled on a right hand door window of a vehicle, said sectional view being taken through a portion of the right hand door window in a plane located substantially as indicated by the line 2—2, on the left hand door window, Fig. 1; Fig. 4, a sectional view of an alternate design of my deflector mechanism supported in the frame of the window structure of a vehicle, said cross sectional view disclosing the deflector mechanism in section substantially on the line 2—2, Fig. 1; and Fig. 5, a partial side view of one corner and end portion of the deflector mechanism.

Similar numerals refer to similar parts throughout the several views.

The body 1 of the automotive vehicle disclosed in Fig. 1 comprises the front window or windshield 2 having the frame portion 3 located in the front and sloping side 4 of the body 1.

The body 1 further comprises the front or side door 5 which is pivotally mounted on the hinge 6, said door 5 thus being located at the front and left side of the body 1 and adjacent the left side portion of the front window and the sloping wall portion 4 of the body 1. The door 5 is provided with the window or glass 7 which is movably mounted in a conventional way in said door of the automotive vehicle, the glass 7 being movably operated in many conventional cars, first in a rearwardly direction as indicated by the arrow 8, Fig. 1, which first provides an initial opening of relatively narrow width as indicated by the position of the dotted line 9 relative to the rear side of the frame 10 of the window structure of the door 5, the rearward movement of the window glass 7 thus providing an initial relatively narrow space 11, indicated in Fig. 2, between the rear side of the frame 10 of the window structure of the door 5 and the dotted line 9, Fig. 1, which indicates the position of the forward edge 12 of the glass or window 7 before the further operation of the operable movement of the glass 7 to an increased open position, the glass 7 in many of the conventional automotive vehicles then being possible of movement downwardly past and through the lower or bottom frame 13 of the door 5 and in the direction of the arrow 14 disclosed in Fig. 1, the further downward movement of the glass 7 resulting in an initial opening between the upper portion 32 of the frame 10 and the upper edge of the glass 7 as indicated by the dotted lines 15 in Fig. 1.

Also it is to be noted that in some conventional window operating mechanisms of the doors of automotive vehicles, the glass 7 will be moved initially and directly downwardly as indicated by the arrow 14 in Fig. 1 without first travelling rearwardly to establish the opening as indicated between the rear side of the frame 10 and the forward edge 12 of the glass 7 and as indicated by the dotted line 9 in Fig. 1, this slightly different operation of the conventional doors or the conventional windows in doors of automotive vehicles resulting in an initial opening or space between the rear side of the frame 10 and the front edge 12 of the glass 7 as indicated by the dotted lines 16 in Fig. 1, said opening, the rear of which is indicated by the dotted line 16, having substantially an equal width for the greater portion of its length but further resulting in a decreasing space or width at its upper portion until the upper edge of the glass 7 is lowered sufficiently in the direction of the arrow 14 to be removed at some distance from the upper portion 32 of the frame 10 of the door 5, the upper edge of the glass 7 extending within and above the upper portion 32 of the frame 10, as indicated by the upper or extended portion of the line 16 when the glass 7 has been movably operated to form said initial opening.

With all of these various described movements of the glass 7, a relatively narrow space 11 is initially obtained and formed between the rear side of the frame 10 and the forward edge 12 of the glass 7 which in conjunction with the passage 11A forms an air passage connecting with the interior of the body 1 to provide ventilation means and characteristics for the interior of the body 1 without exposing the occupants of the body 1 to any flow or passage of cold air, rain, dust, etc., between the frame 10 and the deflector members from the outside of the body 1 into the interior of the body 1, the further movements of the glass 7 in its rearward and downward movements, as indicated by the arrows 8 and 14, being reserved for weather conditions in which an extreme amount of air is desired to be passed or allowed to flow into the interior of the body 1, the relatively small amount of air which passes through the space 11 and the air passage 11A during the initial movements of the glass 7 being required to allow minimum amounts of air to flow to the outside atmosphere from the interior of the body 1 in sufficient quantities only to provide said ventilating characteristics, said air flowing from the interior of the body 1 through the spaces 11 being replaced by infiltration of colder and fresh air into the body 1 in conventional ways as by passing through cracks, window and door operating clearance spaces, cowl ventilators, etc., and in this operation there is a tendency for the passage of cold air from the interior of the body 1 at relatively high speeds especially when the automotive vehicle is in motion, and extreme openings of the glass 7 would result in an undesired and too intensive draft upon the occupants of the body 1 as well as a tendency in conventional window constructions for rain and sleet in stormy weather to also be swept around the outside surface of the frame 10 and through the opening 11, thus further resulting in inconveniences and discomfort to the occupants of the body 1 as a result of the necessity of obtaining ventilating characteristics. These inconveniences and disadvantages are accentuated by the conventional type of deflector mechanisms which are pivotally mounted at the outside of the frame 10 and with more or less openings and apertures between the deflector mechanism and the outside surface of the frame 10, this resulting in the passage or air, sleet, rain, dust, etc., past the forward edge of the conventional deflector mechanisms and resulting in an inefficient deflector operation of the air and inefficient ventilating characteristics for the interior of the body 1.

My deflector mechanism comprises the frame member 17 which is preferably constructed and formed from a thin sheet of metal such as steel, aluminum or similar material and is provided with the channel or guide portion 18 at its outer edge and having the recess or groove 19 therein, the frame 17 being further provided at its inner edge with the curved or radial portion 20 which is extended to form the flange 21 which is adapted to be entered between the resilient or flexible cushion member 22 which represents conventional construction in the frames of window constructions, the cushion member 22 being mounted in the recess 23 of the channel portion 24 which extends longitudinally along the inner edge of the frame 10, the cushion member 22 being formed with a space or recess 25 for receiving the forward edge 12 of the glass 7 when it has been operated to its fully closed position and in contact with the inner surfaces of the recess 25.

The cushion member 22 is provided with the bead portions 26 at each of its sides and in installing the frame 17, the flange 21 is inserted between the bead 26 and the side of the channel portion 24 as disclosed in Fig. 2, the inner corner of the channel portion 18 tightly contacting the outside curved surface 27 at 28, thus effectually providing a tight closure between the channel portion 18 and consequently of the frame member 17 and the outside surface 27 of the frame 10. To further facilitate a tight closure between the curved surface 27 of the frame 10 and the frame member 17, a packing or gasket member 17A constructed of felt, rubber, or similar resilient material and of substantially cylindrical shape is inserted between the outside curved surface 27 and the frame member 17 and adjacent the corner formed by the channel portion 18, said gasket member 17A extending substantially for the length of the frame member 17 and being compressed or distorted, as disclosed in Fig. 2, when the frame member 17 is fastened in its assembled position.

The section as disclosed in Fig. 2 extends substantially for the longitudinal length of the frame member 17, the frame member 17 being formed at its lower side with the curved or radial portion 29 for fitting tightly against the curved surface at the junction of the door 5, the frame member 17 being provided with the elongated curved portion 30 at its forward and upper sides to conform to the shape of the curved surface of the rear side of the frame 10, the frame member 17 being further provided with the curved surface 31 of slightly different dimensions at its upper surface to conform to the lower side of the upper surface of the door 5. The frame 17 thus extends longitudinally along the forward side of the frame of the window construction of the door 5 to substantially the point indicated at 33 in Fig. 1.

The recess 19 of the channel portion 18 of the frame 17 is adapted to receive the resilient and flexible cushion member 34 which is preferably constructed of felt, rubber, or similar resilient material and is provided with the bead portions 35 to provide a more sightly appearance and also to form a tight closure between the flanges of the frame member 17 and the sides of the glass or deflector member 36 which is mounted within the recess 37 of the cushion member 34, the deflector member 36 having its forward and upper edges shaped to conform with the shape of the frame member 17, the rearward edge 38 of the deflector member 36 terminating at the rear end of the frame member 17 and extending for a distance downward substantially in a plane located at right angles to the rear end portion of the frame member 17, the edge 39 of the deflector member 36 being formed and located at an angle with the frame 13 of the window structure of the door 5 and extending to the rear lower edge of the curved portion 29 of the frame 17, the edge 39 of the deflector 36 being joined to the edge 38 by the radius 40, as disclosed in Fig. 1. The deflector member 36 will be constructed of transparent or translucent material such as glass, celluloid, or similar material, and will be of sufficient section to provide rigidity, the deflector member 36 being rigidly secured between the sides of the channel portions of the cushion member 34 so that the deflector member 36 will be rigidly supported to withstand shock loads such as occasioned by the travelling movement of the automotive vehicle and to further withstand the pressure of the air flowing against and past it.

The frame member 17 is also provided with the end portions or members 17B which may be formed by displacing portions of its stock or material and bending said end portions 17B to close the open ends of the recess or groove 19 and to engage the end surfaces of the cushion member 34 thus retaining said cushion member 34 longitudinally in said groove or recess 19.

Fig. 3 discloses the frame member 41 which represents the frame member as necessarily formed to mount my deflector mechanism in association with the frame of the right hand forward window of the right hand door of the body 1 of the automotive vehicle, Fig. 1 disclosing my deflector mechanism as constructed and installed in association with the left hand forward window of the front door 5 of the body 1 of the automotive vehicle. The frame member 41 will be provided with the flange 21 and the channel portion 18 having the recess 19 therein for receiving the cushion member 34, which is provided with the beads 35 in a similar way to that disclosed relative to the frame member 17, Fig. 3, in its fully closed position.

The right hand deflector member for installation with the right hand forward window of the forward door of the body 1 of the automotive vehicle is indicated at 42 in Fig. 3. In order to further secure the deflector members 36 and 42 in the cushion members 34 and the channel portions 18, the outer flange of the channel portions 18 is formed initially substantially as indicated by the dotted lines 43 in Fig. 3 and after the cushion members 34, together with either of the deflector members 36 or 42, are assembled in the channel portions 18, the outer flange of the channel portion is bent or formed from the position as indicated by the dotted lines 43 in Fig. 3 to the position as indicated by the full lines 44, Fig. 3, where the outer flange of the flange 44 tightly clamps and compresses the cushion member 34 in a tight or clamped position against the sides of the deflector members 36 and 42 to secure and rigidly hold and support them in the cushion members 34 of the frame members 17 and 41. The frame members 17 and 41 are each provided with a suitable number of openings for receiving the screws 45 which extend through and threadably engage portions of the frame 10.

My deflector member, as disclosed in Figs. 1, 2 and 3, is especially adapted for use as an accessory to be installed after the body 1 has been constructed and with variations in its shape, form, etc., it can be readily adapted to various shaped windows of various sizes.

When it is desired to install my deflector mechanism as an integral part of the original equipment of the body 1, the deflector member 46 may be rigidly secured in the recess 47 of the cushion member 48 which is installed directly in the groove or slot 49 of the frame 50 of the door 51, as disclosed in Fig. 4.

The frame 50 is provided with the recess 23 for receiving the cushion member 22 which receives the glass 7 in the recess 25 thereof as disclosed relative to the mechanism in Fig. 2.

It is to be noted that the deflector members 36 and 46 will be mounted either substantially parallel with the glass 7 or at a slight angle therewith as disclosed in Figs. 2 and 4 and will have a length, as viewed in Fig. 4, sufficient only to be contained within the width of the doors 5 and 51 so that the deflector members 36 and 46 will not extend beyond the extended outer side wall of the doors 5 or 51, thus eliminating any portions of my deflector mechanism extending beyond the extended outer line of the doors 5 and 51 and thus preventing any interferences with an efficient stream line construction of the body 1 as would be the case if the deflector mechanism members 36 and 46 extended beyond the extended outer outline 52, in Fig. 4, of the doors 5 and 51, and in which extended position the trailing peripheral edge portions of the deflector members 36 and 46 would interfere with the air stream flowing past the body 1.

In operation my deflector mechanism is installed outside of and at the forward edge of the movable window of a door of a vehicle and is secured to the forward frame of the door either by securing the frame portion of my mechanism thereto by screws and by inserting it between the resilient cushion members which are utilized for receiving the movable windows of the door or the deflector members are installed directly without the use of a frame member in suitable cushion members mounted directly within the frame of the window structure of the doors of the vehicle.

When thus associated with the movable windows of the door structure of the vehicle, the forward movement of the automotive vehicle will necessitate air flowing past the outer surface of the deflector members and a relatively slight amount only will be drawn back into the interior of the body of the vehicle past the inside surfaces of the movable windows of the vehicle through a space which has been formed by the initial opening of the windows of the car, thus preventing any relatively large amounts of air from passing through the windows to the exterior of the bodies and to annoy and inconvenience the occupants thereof and at the same time any cold air, sleet, rain, dust, etc., will be prevented from passing between the forward edge of the deflector members and the frame of the window construction of the doors. The rush of cold air past the outer surface of the deflector members carries said rain, sleet, dust, etc., past the body, with the result that only air will be drawn from the interior of the body to join the main stream of air passing rearwardly past the deflector members and past the body, the air from the interior of the body being drawn through the initial or slight openings formed between the movable windows and the frame members of the doors and thus to the exterior of the bodies, thus further resulting in allowing only air of maximum cleanliness and purity to infiltrate into the interior of the bodies in sufficient quantities only for proper ventilating purposes.

I claim:

1. In a deflector mechanism for a body of a vehicle provided with a door having a movable window together with a frame provided with a groove for holding a cushion member for receiving the movable window therein, the combination of a frame member having a shape conforming to the shape of a portion of the frame of said door, said frame member having a flange at its inner side and adapted to extend between the side of said cushion member and a side of said groove of the frame of the door, said frame member being further provided with a portion extending substantially at right angles to said flange, said portion being formed to provide a channel portion at its outer end, said channel portion having its open side extending substantially parallel with said portion extending substantially at right angles to said flange, said channel portion having its base portion tightly engaging the frame of the door, a gasket member interposed and compressed between said frame member and the frame of the door, a cushion member mounted in said channel portion of said frame member, a deflector member fixedly supported in said cushion member mounted in said channel portion of said frame member and having a length contained within the extended outline of the maximum section of the door of the vehicle taken substantially in a horizontal line through said door, said deflector member being supported at its forward edge only, said deflector member being positioned in spaced relationship relative to said movable window to permit air to flow from the interior of the body of the vehicle only by flowing rearwardly between said deflector member and said movable window when said movable window is opened a relatively slight amount, and means for securing said frame member to the frame of said door.

2. In a deflector mechanism for a body of a vehicle provided with a movable window and a window frame having a channel portion, the combination of a frame member having a flange mounted in said channel portion of said window frame, said frame member being provided with a wall portion extending substantially at right angles with said flange and provided with a channel portion at its outer side and tightly engaging said window frame, a cushion member supported in said channel portion of said frame member, a deflector member supported in said cushion member, and means for securing said frame member to said window frame, said means being located between said flange and said channel portion of said frame member.

3. In a deflector mechanism for a body of a vehicle provided with a movable window and a window frame, the combination of a frame member secured to said window frame and provided with a channel portion having a pair of flanges, one of said flanges being formed to extend in a plane located at an angle relative to the other of said flanges, a cushion member in said channel portion of said frame member, and a deflector member in said cushion member and adapted to be clamped therein by said flange of said channel portion extending in a plane relative to the other of said flanges when said flange is bent from its angular position to clamp said cushion member against said deflector member, said deflector member extending in spaced relationship to said movable window.

4. In a deflector mechanism for a body of a vehicle provided with a door having a movable window member and a frame member, the combination of a deflector member located in fixed spaced relationship with said movable window to form a passage therebetween, said deflector member having a length contained within the extended outline of the maximum section of said door taken substantially in a horizontal plane through said door, and means for supporting said deflector member from said window frame, said means fully closing the lowermost, uppermost and frontal portions of the outer side of said space between said deflector member and said window frame to prevent the passage of air therebetween except at the rearmost side only of said space.

5. In a deflector mechanism for a body having a movable window in a window frame, the combination of a deflector member mounted in the forward up and down side of said window frame and in spaced relationship relative to said movable window to form an air passage therebetween, said deflector member extending longitudinally in an up and down direction, said deflector member being wholly located within the peripheral line of the body to eliminate extension beyond the streamline of the body and means comprising sealing means fixedly engaging said deflector member and for supporting said deflector member, said means preventing the passage of horizontal air streams between said window frame and the forward edge of said deflector member.

6. In a deflector mechanism for a body of a vehicle provided with a door having a movable window and a window frame having a rounded corner, the combination of a supporting member secured to said window frame and provided with a wall portion extending at right angles to the window opening and tangent to said rounded corner, a deflector member supported by said supporting member in a sole fixed position at its outer extremity, said deflector member having a length contained within the extended outline of the maximum section of said door taken substantially in a horizontal plane through said door, said deflector member being spaced from said movable window to form an air passage therebetween, and means for clamping said deflector member in said supporting member.

7. In a deflector mechanism for a body provided with a movable window together with a window frame, the combination of a frame member supported on said window frame and provided with a portion provided with a channel groove having side wall portions together with end portions formed to close the ends of said channel groove, a cushion member secured in said channel groove and engaging said end portions closing the ends of said channel groove, and a deflector member mounted in said cushion member and extending in spaced relationship with said movable window to provide an air passage connecting with the interior of the body.

8. In a deflector mechanism for a body of a vehicle having a door together with a movable window and a frame provided with a groove for receiving the movable window therein, the combination of a frame member supported on the frame of the door and provided with a flange extending into said groove, said frame member having a wall portion extending transversely relative to the window, said wall portion terminating at its outer edge in a channel portion, said channel portion extending substantially for the total length of said frame member, and a deflector member mounted in said channel portion of said frame member, said deflector member lying solely in a plane extending in an up and down direction, said deflector member and said wall portion of said frame member forming a closure at the uppermost and lowermost and front sides of a space formed between said deflector member and said movable window of the vehicle.

9. In a deflector mechanism for a body of a vehicle provided with a movable window in a window frame, the combination of a frame member supported on said window frame and provided with a channel portion extending for substantially the total length of said frame member at its outer side, said frame member having a length sufficient to engage upper, lower and frontal portions of said window frame, said channel portion having its inner side wall located adjacent said window frame, and a gasket member compressed between said frame member and said window frame adjacent said channel portion to provide sealing means between said channel portion of said frame member and said window frame, said gasket member extending continuously substantially for the total length of said frame member.

10. In a deflector mechanism for a body of a vehicle provided with a movable window and a window frame, the combination of a supporting member secured to said window frame to provide a sole fixed position of said supporting member relative to said window frame, said supporting member having a channel portion extending substantially for the total length of said supporting member to extend adjacent lower, upper and frontal sides of said window frame, and a deflector member fixedly supported in said channel portion of said supporting member, said deflector member having its lowermost, uppermost and frontal edge portions enclosed by said channel portion of said supporting member, said deflector member having its rearmost edge portions only exposed.

11. In a deflector mechanism for a body of a vehicle provided with a movable window and a window frame having a groove for receiving said movable window therein, said window frame further having a curved surface between its front outer side and said groove, the combination of a supporting member having a flange mounted in said groove together with a wall portion extending tangent to said curved surface of said window frame, the outer edge portion of said wall portion being formed to provide a channel portion extending forwardly of said wall portion and having a corner surface substantially engaging said curved surface of said window frame to provide a closure between said supporting member and said curved surface of said window frame, and a deflector member mounted in said channel portion of said supporting member.

12. In a deflector mechanism for a vehicle body provided with a movable window and a window frame, the combination of a deflector member forming, with said movable window, an air passage therebetween, said air passage connecting with the interior of the vehicle body and with air flowing past the window frame of said vehicle body, and means secured to said window frame for supporting said deflector member totally within the area of said window frame when disclosed in a horizontal section through said deflector member and said window frame, said deflector member being thereby supported within the streamline of said vehicle body, said means being provided with a channel portion at its outermost extremity for enclosing all edge portions except the rearmost edge portion of said deflector member.

13. In a deflector mechanism for a body of a vehicle provided with a window frame having an opening therethrough together with a window movably mounted in said opening, the combination of a groove in said window frame and extending around said opening, said groove receiving said window therein, a second groove in said window frame and extending adjacent the front portion only of said opening, and a deflector member mounted in said second groove, said deflector member and said window forming a relatively narrow passage connecting with the interior of the body and the outside atmosphere.

14. In a deflector mechanism for a body of a vehicle provided with a movably mounted window and a window frame, the combination of a member secured to said window frame and provided with a pair of flange portions, one of said flange portions extending at an angle relative to the other of said flange portions, a cushion member between said flange portions, and a deflector member mounted in said cushion member and extending adjacent said movably mounted window to form an air passage therebetween, said last mentioned flange portion being bent to clamp said cushion member and said deflector member between said pair of flange portions.

15. In a deflector mechanism for a body of a vehicle provided with a movable window and a window frame, said movable window forming a relatively narrow opening at its forward side during its initial opening movement, the combination of a frame member fixedly secured to lower, front and upper portions of said window frame, said lower portion having a substantially lesser length than said upper portion of said frame member, said frame member extending outwardly and angularly relative to said movable window, said frame member further extending longitudinally in an up and down direction, and a sole deflector member having its lower, front, and upper edge portions fixedly supported and enclosed by said frame member, said lower edge portion of said sole deflector member having a substantially lesser length than the length of the upper edge portion thereof to conform to the length of said lower portion of said frame member, said sole deflector member having a sole trailing edge extending upwardly and rearwardly from the rear end of said lower portion of said frame member and providing a triangular space between said sole trailing edge of said sole deflector member and the upper surface of the lower side of said window frame, said sole deflector member being located solely in a plane extending in an up and down direction, said sole deflector member extending in spaced relationship to said movable window.

16. In a deflector mechanism for a body of a vehicle provided with a window frame having an opening provided with a lower corner portion together with a movable window, the combination of a deflector member located adjacent one end of said opening of said window frame and formed to provide a triangular shaped opening between the lower edge of said deflector member and the lower side of said opening of said window frame, and means for supporting said deflector member from said window frame, said means being provided with a lower side portion having a relatively short length terminating adjacent said lower corner portion of the opening of said window.

17. In a deflector mechanism for a body exposed to an air stream flowing there adjacent and provided with a movable window and window frame, the combination of a deflector member adjacent the front portion of said window frame and located solely between the outside of the body and said movable window, said deflector member forming, with said movable window, an air passage connected solely at its front end with the interior of the body, said air passage being open solely at its rearward side, and means secured to said window frame and supporting said deflector member, said means being provided with a flange portion adapted to be displaced to clamp said deflector member in said means.

AUGUST E. WILSHUSEN.